United States Patent
Cowan

[15] 3,699,928
[45] Oct. 24, 1972

[54] CATTLE SPRAYING DEVICE
[72] Inventor: Frank O. Cowan, R.R. 1, Golden City, Mo. 64748
[22] Filed: July 14, 1971
[21] Appl. No.: 162,336

[52] U.S. Cl. ............................................. 119/159
[51] Int. Cl. ...... A01k 29/00, A61d 7/00, A61d 11/00
[58] Field of Search ..................................... 119/159

[56] References Cited

UNITED STATES PATENTS

| | | | |
|---|---|---|---|
| 3,173,402 | 3/1965 | Cassel | 119/159 |
| 3,496,914 | 2/1970 | Cowan | 119/159 |
| 3,602,199 | 8/1971 | Diggs | 119/159 |

*Primary Examiner*—Aldrich F. Medbery
*Attorney*—John A. Hamilton

[57] ABSTRACT

A cattle spraying device comprising a chute through which cattle or the like may be driven, the floor of said chute constituting a treadle depressible by the weight of said cattle, and a pump operable by the depression of said treadle to spray cattle passing through said chute with insecticide or other spray materials, said pump being specially adapted to deliver the spray liquid only when said treadle is depressed and for a limited time if the treadle remains depressed, and to deliver a uniform but adjustable quantity of spray for each depression of the treadle.

5 Claims, 4 Drawing Figures

PATENTED OCT 24 1972
3,699,928
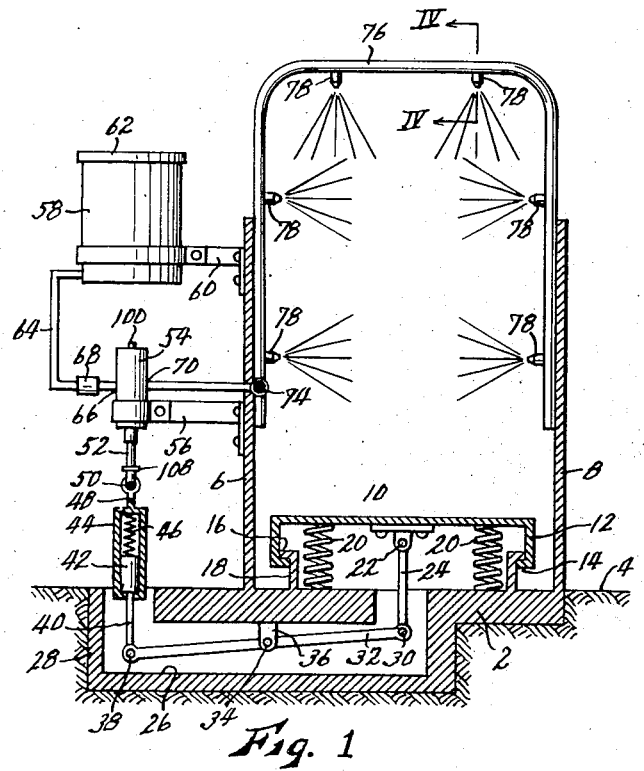
Fig. 1
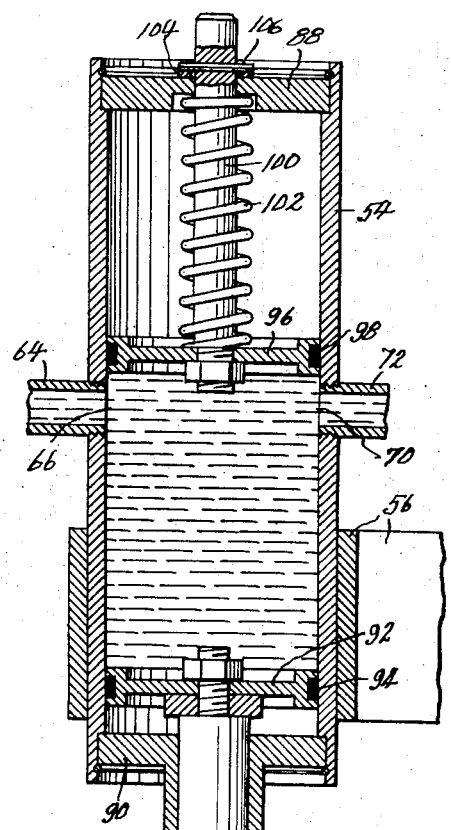
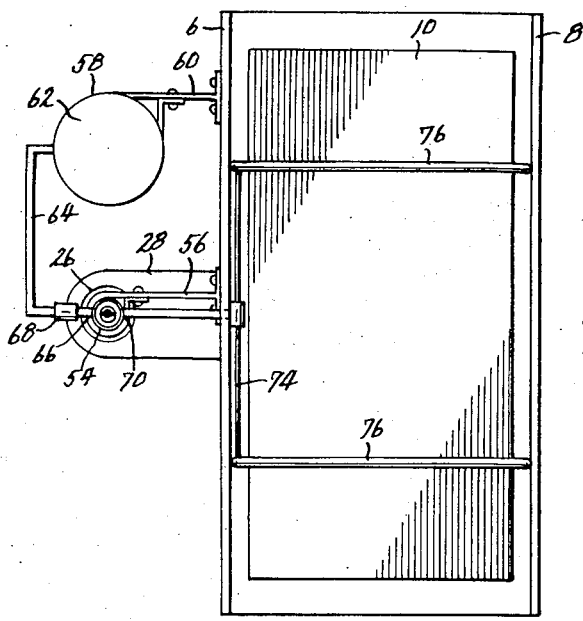
Fig. 2
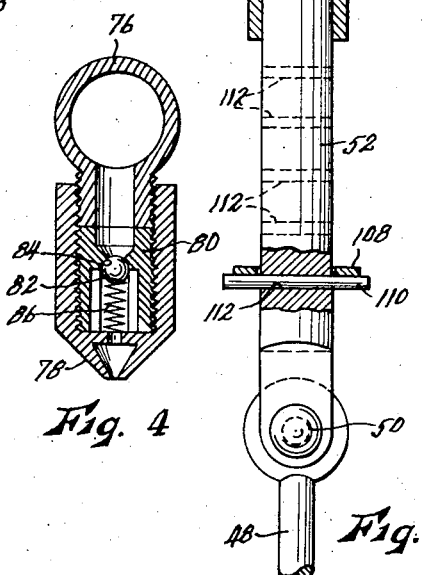
Fig. 4
Fig. 3
INVENTOR.
Frank O. Cowan
BY John A. Hamilton
Attorney.

3,699,928

CATTLE SPRAYING DEVICE

This invention relates to new and useful improvements in devices for spraying cattle or other livestock with liquid insecticides or the like.

Devices for this purpose have heretofore been proposed wherein cattle are driven through a chute or passageway about which spray nozzles are arranged, so that each animal is sprayed as it passes through the chute. However, certain difficulties are common with this type of apparatus, particularly in insuring that each animal receives enough but not too much spray, and that the spray material is not wasted. If the spray nozzles are operated continuously, the animals must move continuously at a uniform speed, since if an animal pauses or balks in the chute, it receives too much spray, which may be harmful as well as wasteful. If there is any appreciable time lapse between the entry of successive animals into the chute, the insecticide is of course sprayed into the air and wasted. It is often difficult to drive the animals through the chute so that they move uniformly therethrough with substantially no spaces or gaps therebetween. The present invention is directed to a simple and economical, but effective solution to these problems.

Accordingly, the principal object of the present invention is the provision of a chute-type spraying device of the character described having means whereby the spraying mechanism is actuated by the presence of an animal in the chute, so that the sprays do not continue and waste the insecticide when no animal is in the chute. This action is entirely automatic, requiring no attention from a human operator.

Another object is the provision of a cattle spraying device of the character described wherein the spraying action and volume of insecticide dispensed as each animal passes through the chute is closely regulated and limited, so that the insecticide is not wasted, nor the animal over-sprayed, if an animal should pause or balk in the chute.

Still another object is the provision of a cattle spraying device of the character described in which the spraying mechanism is powered entirely by the weight of the animals themselves, requiring no power of any kind from any other source.

A further object is the provision of a cattle spraying device of the character described including a pump operable to deliver an adjustable quantity of insecticide each time an animal enters the chute, to cease operation after said regulated amount of insecticide has been delivered even if the animal should pause or balk in the chute, and to cease operation whenever an animal leaves the chute.

Other objects are simplicity and economy of construction, efficiency and dependability of operation, and adaptability for use in a wide variety of applications.

With these objects in view as well as other objects which will appear in the course of the specification, reference will be had to the accompanying drawings wherein:

FIG. 1 is a partially schematic transverse vertical sectional view of a cattle spraying device embodying the present invention, with parts left in elevation, FIG. 2 is a top plan view of the device as shown in FIG. 1, FIG. 3 is an enlarged longitudinal sectional view of the pump cylinder and related parts, and FIG. 4 is an enlarged sectional view taken on line IV—IV of FIG. 1.

Like reference numerals apply to similar parts throughout the several views, and the numeral 2 applies to a planar base formed of concrete or the like and sunk into the ground so that its upper surface is flush with the ground level 4. Formed integrally with or affixed to said base are a pair of upstanding vertical walls 6 and 8. Said walls are parallel and spaced apart to form a chute or passageway therebetween through which cattle may be driven, and are sufficiently close together that the animals must pass therebetween in single file. The floor of said chute constitutes a horizontal vertically movable treadle 10 having around its edges a depending skirt 12 provided at its lower edge with an inturned lip 14 which is engaged beneath an out-turned lip 66 at the upper edge of an upstanding wall 18 affixed at its lower edge to base 2. The treadle is biased upwardly by springs 20 interposed between the treadle and the base, its upward movement being limited by the interengagement of lips 14 and 16, but is movable downwardly against said springs by the weight of an animal positioned thereon.

Pivoted to the lower side of treadle 10 at 22 is a generally vertical link 24 which projects downwardly into a passageway 26 formed in base 2, said passageway extending laterally beneath chute wall 6, and opening upwardly beneath treadle 10 and at a point spaced laterally outwardly from wall 6. Base 2 is provided with a lateral extension 28 in which a portion of said passageway is formed. The lower end of link 24 is pivoted, as at 30, to one end of a generally horizontal beam 32 which is pivoted intermediate its ends, as at 34, to a mounting member 36 fixed in base 2, for rocking movement on a horizontal axis. The opposite or outer end of beam 32 is pivoted, as at 38, to the lower end of a generally vertical rod 40 to the upper end of which is affixed a plunger 42 movable vertically in a tubular spring housing 44, a compression spring 46 being interposed between said plunger and the closed upper end of said housing. Fixed to the upper end of said housing, coaxially therewith, is a rod 48 the upper end of which is pivoted, as at 50, to the free end of a piston rod 52 operatively associated with a pump cylinder 54. Said pump cylinder is disposed vertically, and is rigidly mounted on chute wall 6 by means of bracket 56. As will appear, cylinder 54 constitutes the primary element of a pump for delivering insecticide or other liquid spray material from a reservoir to spray nozzles arranged about the chute.

As shown, the reservoir constitutes a tank 58 mounted on chute wall 6 by means of a bracket 60 and having a removable cover 62. A conduit 64 interconnects the lower portion of said tank with the intake 66 of cylinder 54, and a check valve 68 interposed in said conduit is operable to permit flow from the tank to the cylinder, but not in a reverse direction. The output 70 of cylinder 54 is connected by a conduit 72 with a header pipe 74 extending longitudinally of the chute inside of wall 6. Said header pipe interconnects with one or more spray pipes 76 which have the form of arches of inverted U-shape bridging the chute at longitudinally spaced points therealong. Said spray pipes are sealed at their ends, and each is fitted with a series of spray nozzles 78 positioned to spray an animal as it passes through the chute. The number and positions of the nozzles may of course be selected as desired to insure thorough coverage of the parts of the animals to which it may be desired to apply the insecticide or the like. As best shown in FIG. 4, each nozzle 78 is equipped with a check valve insert 80 including a valve ball 82 urged yieldably into a valve seat 84 by a spring 86, whereby to open in response to elevated pressure in pipe 76 to permit discharge of insecticide, but to close to prevent intake of air into pipe 76 when pressure therein drops.

The construction of the pump is best shown in FIG. 3, wherein it will be seen that the upper and lower ends of cylinder 54 are closed by end walls 88 and 90 respectively, and that inlet and outlet conduits 64 and 72 open into said cylinder approximately midway of the length thereon. Operable in the lower portion of the cylinder is a pump piston 92 having a sealing ring 94 and affixed to the upper end of piston rod 52, which extends slidably through end wall 90. Operable in the upper end of the cylinder is an accumulator piston 96 having a sealing ring 98 and affixed to the lower end of a piston rod 100 which extends slidably through top end wall 88. A compression spring 102 disposed about said piston rod between end wall 88 and piston 96 biases said piston downwardly, and a washer 104 carried on said piston rod above end wall 88, and secured thereon by cross pin 106, limits the downward movement of piston 96 to the position shown, wherein it approaches but does not cover or pass inlet and outlet openings 66 and 70. The upward movement of piston 96 is limited by a washer 108 mounted on piston rod 52 below end wall 90, and secured by a cross pin 110 inserted transversely through any one of a series of holes 112 formed therefor in the piston rod. When washer 108 is set to permit maximum travel of piston 92, as illustrated, it limits the upward movement of said piston to a position at which it approaches but does not cover or pass inlet and outlet openings 66 and 70. The stroke of piston 92 is so related to the maximum possible depression of treadle 10, and to the linkage interconnecting them, that full depression of the treadle will produce said maximum travel of said piston. Treadle springs 20 permit full depression of the treadle by the weight of any single animal to be sprayed. Spring 46 is also of such strength as to be fully compressed by the weight of an animal on the treadle, but is sufficiently stronger than accumulator spring 102, that the latter may be fully compressed before the formed yields appreciably. The stroke of piston 92 may be varied by inserting cross pin 110 selectively in other of holes 112, whereby to adjust the position of washer 108.

In use, when no animal is in the chute, the parts have the relative positions shown in the drawing, springs 20 then elevating treadle 10 to its maximum elevation, and through link 24, beam 32, rod 40, spring housing 44, rod 48 and piston rod 52, moving pump piston 92 to the lower limit of its travel, as shown. When an animal enters the chute, its weight depresses the treadle to its full extent, wherein lip 14 thereof rests on base 2, against springs 20. The depression of the treadle acts through link 24, beam 32, rod 40, plunger 42, spring 46, rod 48 and piston rod 52 to elevate pump piston 92 in cylinder 54. Movement of piston 92 elevates the pressure in the liquid insecticide between pistons 92 and 96, this pressure rise closing check valve 68, opening the check valves 82 of the nozzles, and ejecting insecticide from said nozzles to spray the animal.

The rising motion of piston 92 is very rapid, almost instantaneous, as the animal places its weight on the treadle, much more rapidly than the insecticide can be sprayed from the nozzles. Therefore, as piston 92 rises, piston 96 is also raised against spring 102. Thus, very little spray action occurs as piston 92 rises, most of it occurring after piston 92 has been elevated to its full extent, by virtue of the subsequent downward movement of piston 96 under the pressure of spring 102. Thus the fluid spray pressure at the nozzles is always determined by spring 102, and is in no way determined by or dependent on the particular weight of each animal. The maintenance of a uniform spray pressure despite variation in the weights of the animals, is important to the effective and efficient operation of the nozzles.

The maximum amount or volume of spray which is ejected for each depression of the treadle is determined by the displacement of piston 92, which as previously described is rendered adjustable by the placement of washer 108 on piston rod 52. The volume of spray which should be applied to each animal is affected by the type of spray being applied, the general size of the animals, and other factors, and may be adjusted as necessary or desirable. If washer 108 is set higher than illustrated on the piston rod, to provide a smaller displacement of piston 92, then the washer will engage the extension 90' of end wall 90, arresting the movement of the piston, before treadle 10 has completed its downward movement. In that case, the remaining descent of the treadle is accommodated by compression of spring 46. However, as previously mentioned, spring 46 is strong enough that it will not yield until spring 102 has been fully compressed. Therefore spring 46 itself does not directly affect either the volume of liquid sprayed, or the spray pressure. Thus both the spray volume and pressure are closely regulated, and are not affected by varying weights of successive animals, even though the weight of the animals supplies the sole operating power.

It will be apparent that once the treadle is depressed and remains depressed, the spray action will continue only until piston 96 has completed its downward stroke, at which time a spray volume equal to the displacement of piston 92 has been dispensed, and at which time the spray action ceases for lack of operating pressure. Thus if an animal pauses, balks, or for any reason stops in the chute with its weight on the treadle, it will receive only the amount of spray equal to the displacement of piston 92, which as set forth above is adjusted to equal the amount of spray which should be applied to a single animal. As previously mentioned, overspraying of an animal may in some cases be harmful to the animal, but in any event is wasteful of the spray material. Obviously, the spray interval or duration should be timed to apply the desired amount of spray material to an animal in approximately the time it requires for said animal to pass through the chute at a normal speed. On the other hand, if an animal should bolt or race through the chute at a greater than normal speed, the spraying action is initiated as before, but ceases instantly when the animal's weight leaves the treadle, in that springs 20 immediately elevate the treadle and lower piston 92 in cylinder 54 to relieve the pumping pressure. This further avoids possible wastage of the spray liquid. Whenever treadle 10 is raised by springs 20, whether the return stroke of accumulator piston 96 has been completed or not, the resultant downward movement of piston 92 creates a reduced pressure between the pistons, which closes nozzle check valves 82, opens check valve 68, and sucks spray liquid from reservoir 58 through conduit 64 into the cylinder. Thus the cylinder is kept fully charged with spray liquid at all times.

In order to insure that the above described pumping action will occur for each animal which enters the chute, it is necessary that treadle 10 be released and elevated as each animal leaves the chute. If, on the contrary, said treadle were held continuously depressed by a continuous succession of animals passing thereover, the first animal would be sprayed and the spray action would then stop as described above, successive animals not being sprayed at all. The desired result could be obtained by driving the animals through the chute one at a time, with reasonable intervals therebetween, but this would be difficult and tedious. Preferably, the treadle is made of such short longitudinal length as to render it quite unlikely that more than one animal would have their weight on the treadle at the same time. A treadle length no greater than, or even slightly less than, the length of a single animal has been found satisfactory for this purpose.

While I have shown and described a specific embodiment of my invention, it will be readily apparent that many minor changes of structure and operation could be made without departing from the spirit of the invention.

What I claim as new and desire to protect by Letters Patent is:

1. A cattle spraying device comprising:
   a. a base having upstanding walls defining a chute through which cattle may pass,
   b. a treadle carried for vertical movement by said base and forming the floor of said chute, whereby to be depressed by the weight of cattle passing through said chute,
   c. means yieldably biasing said treadle upwardly,
   d. spray nozzles positioned to direct liquid spray against cattle within said chute,
   e. a reservoir for spray liquid,
   f. a conduit interconnecting said reservoir with said nozzles, and
   g. a pump interposed in said conduit and operable by vertical oscillation of said treadle to deliver spray liquid under pressure to said nozzles, said pump comprising:
      1. a rigidly mounted pump cylinder,
      2. a pump piston operatively mounted in said cylinder for advancing and retracting movement therein, said conduit being interconnected into said cylinder in advance of all positions of said piston,
      3. connecting means joining said treadle and said pump piston whereby said piston is advanced by depression of said treadle and retracted by release of said treadle,
      4. a pair of check valve means interposed in said conduit respectively at opposite sides of its interconnection with said pump cylinder and each operable to permit liquid flow only toward said nozzles,
      5. an accumulator cylinder interconnected with said pump cylinder in advance of all positions of said pump piston,
      6. an accumulator piston operatively mounted in said accumulator cylinder for advancing movement toward the connection of said accumulator cylinder with said pump cylinder and retracting movement away from said connection, and
      7. resilient means biasing said accumulator piston in its direction of advancement, whereby said treadle may be depressed, and said pump piston advanced, more rapidly than spray liquid can be delivered to said nozzles, said accumulator cylinder accommodating the excess liquid by retraction of said accumulator piston, and whereby delivery of said liquid to said nozzles is continued by the advancement of said accumulator piston by said resilient advancing means after advancement of said pump piston is halted.

2. The combination as recited in claim 1 wherein said pump and accumulator cylinders constitute opposite end portions of a single cylinder, said pump and accumulator pistons being mounted in opposed relation in said single cylinder, said conduit being interconnected into said single cylinder at a position thereof intermediate said pistons.

3. The combination as recited in claim 1 with the addition of stop means operable to limit the advancement of said pump piston whenever said treadle is depressed, said stop means being adjustable to select the quantity of spray liquid delivered to said nozzles each time said treadle is depressed.

4. The combination as recited in claim 3 wherein said treadle is depressed the same distance, against a fixed support, by the weight of any animal supported thereby, said distance being sufficient to produce maximum advancement of said pump piston through said connecting means, and with the addition of a resiliently yieldable member interposed in said connecting means and operable to yield to permit full depression of said treadle whenever said stop means is adjusted to limit advancement of said pump piston to any amount less than said maximum.

5. The combination as recited in claim 4 wherein said resilient member in said connecting means is sufficiently stronger than said resilient means biasing said accumulator piston in its direction of advancement, that said accumulator piston may be fully retracted by fluid pressure thereagainst before the resilient member in said connecting means yields.

* * * * *